United States Patent [19]

Brock

[11] 4,022,342
[45] May 10, 1977

[54] SELF-LOADING CARRIER WITH TRAILING END BOGIE

[76] Inventor: Gibson E. Brock, R.D. 5 Persimmon Road, Sewickley, Pa. 15143

[22] Filed: Nov. 4, 1975

[21] Appl. No.: 628,769

[52] U.S. Cl. .............................. 214/392; 280/426
[51] Int. Cl.² .......................................... B60P 3/40
[58] Field of Search .......... 214/390, 392, 394, 396; 280/426, 442

[56] References Cited

UNITED STATES PATENTS

| | | | |
|---|---|---|---|
| 2,376,296 | 5/1945 | Walter | 214/394 |
| 2,764,424 | 9/1956 | Standing | 280/426 |
| 3,156,487 | 11/1964 | Bigge | 280/426 |
| 3,348,711 | 10/1967 | Gove | 214/392 |
| 3,511,398 | 5/1970 | Lyster et al. | 214/394 |
| 3,721,358 | 3/1973 | Brock | 214/394 |

Primary Examiner—Albert J. Makay
Attorney, Agent, or Firm—Buell, Blenko & Ziesenheim

[57] ABSTRACT

A self-loading rubber-tired carrier comprises a tractor and a trailer adapted to carry elongated loads slung below it. The rear end of the trailer is pivotally supported on a double-axle bogie having its own engine, and releasable means are provided for rotating the bogie in correspondence with angular movement between trailer and tractor so that the apparatus can move from a traveling position with tractor and bogie aligned with the trailer to a loading position with tractor and bogie at an angle to the trailer, with skidding of the bogie wheels no greater than skidding of the tractor rear wheels.

15 Claims, 9 Drawing Figures

U.S. Patent May 10, 1977 Sheet 1 of 2 4,022,342
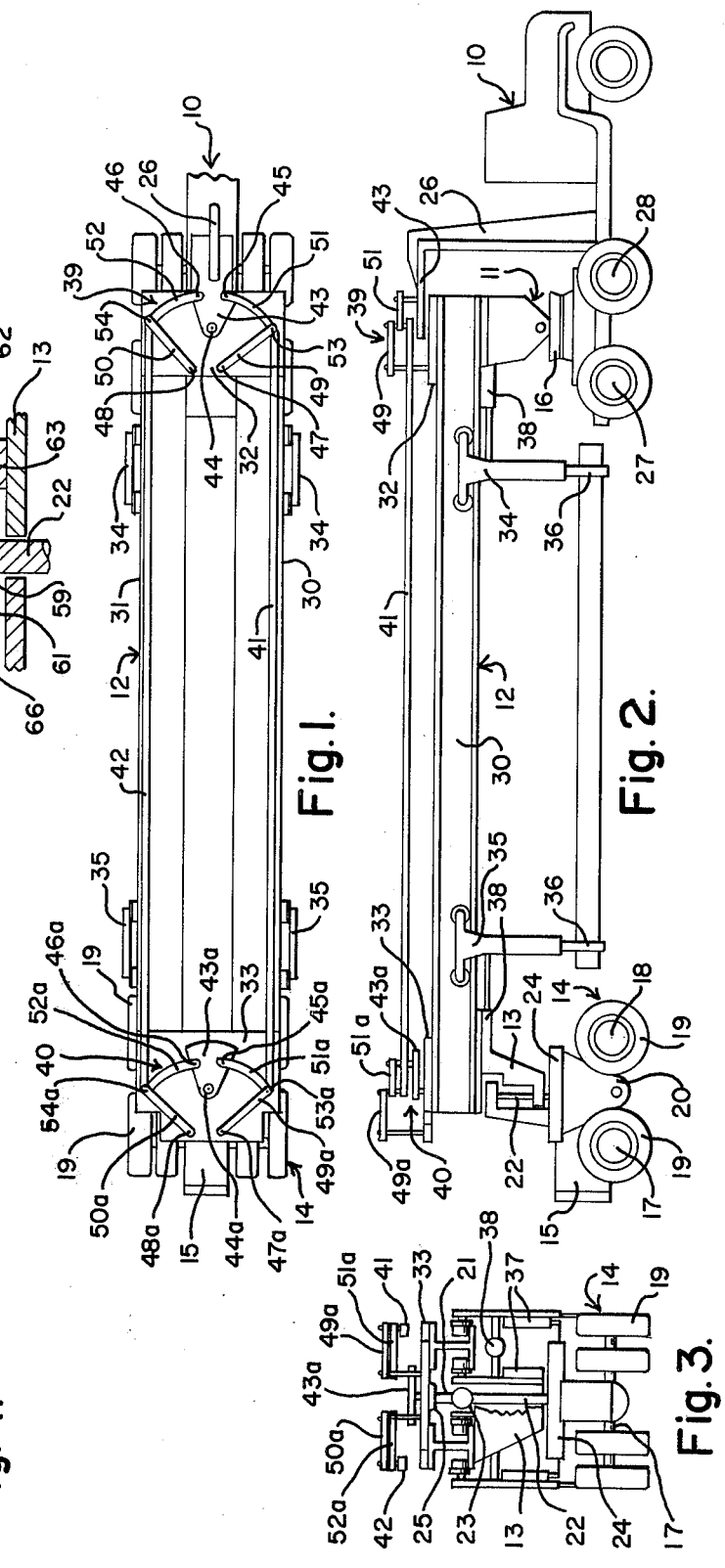

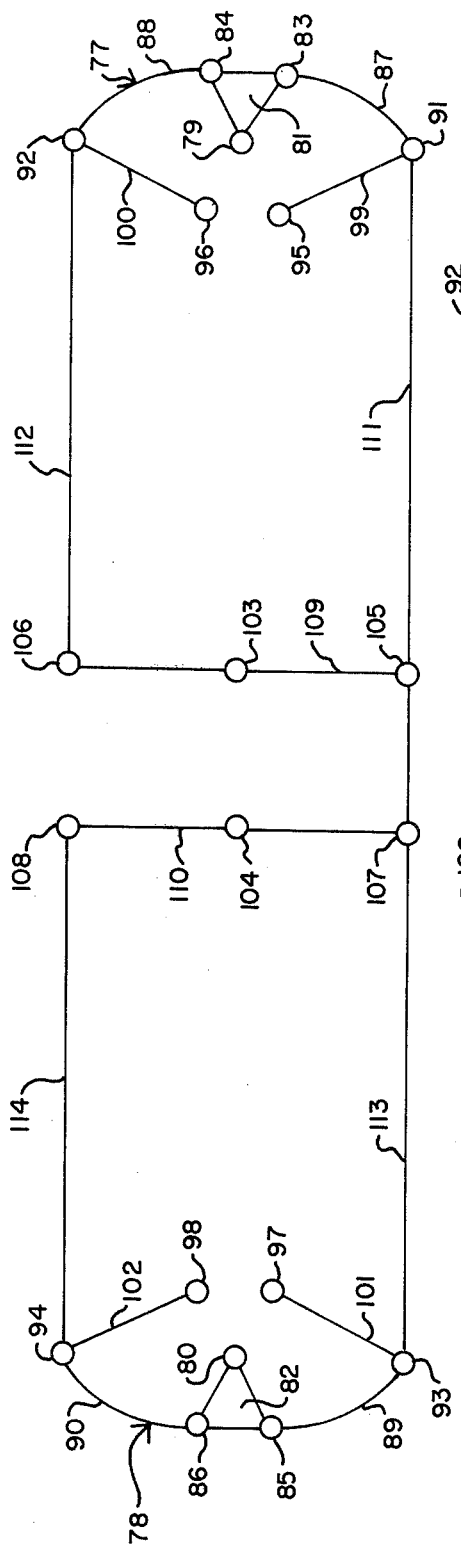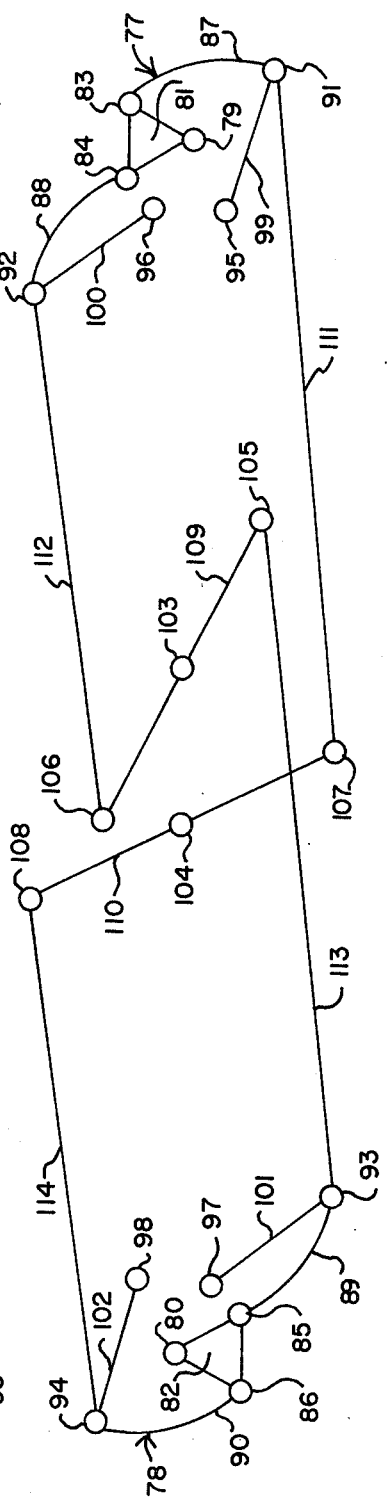
Fig. 8.
Fig. 9.

SELF-LOADING CARRIER WITH TRAILING END BOGIE

This invention relates to rubber-tired self-loading carriers adapted to transport loads of elongated articles over-plant roadways and to stocking areas between aisles. It is more particularly concerned with such carriers which provide double-axle support for the load at both ends, and the method of steering such carriers.

This invention is an improvement to the carrier of my U.S. Pat. No. 3,721,358 dated Mar. 20, 1973, entitled SELF-LOADING CARRIER. The disclosure of that patent is incorporated herein by reference and made a part hereof.

The carrier of that patent comprises an elongated bridge unit supported at its front end by a conventional tractor unit and at its rear end by a powered and rotatable trailing unit having only one axle. In the operation of that carrier the trailing end unit is rotated 90° around its vertical pivot while the carrier is stationary in order that the carrier may travel broadside with its front and rear units along spaced separate aisles so as to straddle the load. The vertical pivot of the trailing end is directly above the center of the trailing end axle and the trailing end can therefore be rotated about its pivot without skidding its wheels. This mode of operation makes undesirable the use of a double-axle bogie at the trailing end, as the wheels of such a bogie would have to skid as the bogie was rotated about a vertical pivot which could not be directly above both axles. For heavy loads it would be desirable to support the rear end of the bridge with a double-axle bogie.

It is an object of my invention to provide a carrier as above described having a trailing end bogie, which carrier is steerable without undue skidding of any wheels from a position in which its tractor and trailing end units are aligned with the bridge to a position in which those units are at right angles to the bridge. It is another object of my invention to provide a method of steering such a carrier. Other objects of my invention will appear in the course of the description thereof which follows.

The carrier of my invention differs from that of my patent previously mentioned in having a two-axle trailing end bogie connected to the rear end of the bridge by a vertical pivot spaced intermediate the bogie axles. It is also provided with steering means causing the bogie to rotate about that pivot in correspondence with rotation of the tractor with respect to the bridge, and means to disengage those means. Means are mounted on the bridge for picking up and carrying elongated loads, which may be the same as those means described in my patent. The method of operation of my carrier differs from that described in my patent in that my carrier is driven along a driveway and into the pairs of aisles straddling the load by steering the tractor into the farther aisle and causing the bogie to rotate in the same degree and the same direction as the tractor with respect to the bridge. In this way the wheels of the bogie follow a path into their aisle which is parallel to the path of the rear wheels of the tractor into their aisle, and in so doing do not skid any more than do the tractor rear wheels.

An embodiment of my invention presently preferred by me is illustrated in the attached figures to which reference is now made:

FIG. 1 is a partial plan of my apparatus in its traveling position,

FIG. 2 is a side elevation of the apparatus of FIG. 1,

FIG. 3 is an end elevation of the apparatus of FIG. 1, partially broken away,

FIG. 4 is a partial plan of my apparatus with the bogie turned 90° from its traveling position, FIG. 5 is a detail in plan of apparatus for locking the bogie to the bridge, or alternatively to the steering means, FIG. 6 is a cross section through the apparatus of FIG. 5 taken on the plane 6—6, FIG. 7 is a plan of the apparatus of FIG. 5 in another position, FIG. 8 is a schematic plan of an alternative steering mechanism in its traveling position, and FIG. 9 is a schematic plan of the apparatus of FIG. 8, but in another position.

My apparatus comprises three main components, a conventional tractor 10 with three axles, a trailing end bogie 14 with two axles, and a load-carrying bridge 12 supported at its front end 11 by tractor 10 and at its rear end 13 by bogie 14. That bogie is provided with an engine 15 which is connected through a clutch and gear box containing a reverse gear and differential, not shown, to one or both of axles 17 and 18. Those axles are provided at each end with rubber-tired double wheels 19. The housings of axles 17 and 18 are connected on each side of bogie 14 by leaf springs, not shown, cantilevered at their centers on trunnions 20 which are pivotally affixed to bogie structure 24. Trailing end 13 of bridge 12 is pivotally mounted on bogie 14 on pivot shaft 22 which is centrally attached to bogie structure 24, and through a clutch mechanism and locking mechanism 23, to an upward extension 21 of pivot shaft 22 for a purpose to be described.

Front end 11 of bridge 12 is pivotally mounted on tractor 10 through an inverted fifth wheel arrangement 16, which is described in my U.S. Pat. No. 3,721,358. The vertical pivot is centrally located with respect to the two rear axles 27 and 28 of tractor 10. These axles are spaced apart the same distance as are bogie axles 17 and 18. Tractor 10, for a purpose to be described, is provided with an upstanding member 26 spaced from front end 11 of bridge 12 a distance sufficient to allow bridge 12 to swing 90° around its vertical pivot on tractor 10. Otherwise, tractor 10 is conventional.

Bridge 12 comprises parallel wide-flange beams 30 and 31, their lower flanges affixed at their front ends to front end structure 11 and at their rear ends to rear end structure 13. Their upper flanges are connected at their front ends by plate 32 and their rear ends by plate 33. The lower flange of each beam carries a forward trolley 34 and a rearward trolley 35, which are essentially the same as the trolleys described in my patent above mentioned. Suspended from each trolley are load-engaging means 36, lifted by hydraulic cylinders 37 carried by the trolley. Trolleys 34 and 35 are caused to travel along beams 30 and 31 by horizontally positioned hydraulic cylinders 38 at the front and rear ends of bridge 12, also as described in my patent above mentioned.

upstanding member 26 supports a horizontal plate 43 which extends rearwardly therefrom and immediately above plate 32 to a point rearward of the vertical axis of fifth wheel 16 of tractor 10.

Mechanical means for rotating bogie 14 with respect to bridge 12 and controlling that rotation to correspond with the rotation of tractor 10 with respect to bridge 12 are shown in plan in FIGS. 1 and 4. Those means comprise tractor triple linkage 39, identical bogie triple linkage 40, and right and left side connecting-links 41 and 42 respectively. Tractor linkage 39 comprises horizontal plate 43 previously mentioned. Rotation of upright member 26 relative to bridge 12 causes plate 43 to pivot about center point 44 which is vertically aligned with the pivot of fifth wheel 16. Plate 43 forward of center point 44 is fitted with right and left side stub vertical pivot shafts 45 and 46 respectively, spaced symmetrically apart from each other transversely of plate 43 and equidistant from pivot point 44. Affixed to plate 32 of bridge 12 are stub right and left side vertical pivot shafts 47 and 48 respectively, symmetrically spaced from each other transversely of the center line of bridge 12. Pivots 47 and 48 are located rearwardly of pivot point 44.

Pivotally mounted at one end on pivot shafts 47 and 48 are links 49 and 50 respectively. Pivotally mounted at one end on pivot shafts 45 and 46 are arcuate links 51 and 52 respectively. The outer ends of links 49 and 51 are pivotally connected by pivot pin 53 and the outer ends of links 50 and 52 are pivotally connected by pivot pin 54. The length of links 49 and 50 between pivot points is about twice the distance between pivot point 44 and pivot 45 or 46. Arcuate links 51 and 52 are about as long between pivot points as links 49 and 50.

Bogie linkage 40 is a duplicate of tractor linkage 39 and the links and their pivot pins of bogie linkage 40 are disignated with the same reference numbers as those which have previously been applied to the corresponding elements of tractor linkage 39, followed by the letter a. Vertical pivot point 44a, however, is the axis of bogie upper pivot shaft 21. Plate 43a is fixed to shaft 21, projecting forwardly thereof and turns with it. It carries stub right and left side pivot shafts 45a and 46a respectively located forwardly of shaft 21 as shown in FIG. 1, but spaced symmetrically apart from each other transversely of plate 43a. Right and left stub pivot shafts 47a and 48a are affixed to plate 33 of bridge 12. Right connecting-link 41 pivotally connects pivot pins 53 and 53a and left connecting-link 42 pivotally connects pivot pins 54 and 54a.

Clutch and locking mechanism 23 is shown in detail in FIGS. 5, 6 and 7. Pivot shaft 22, which is affixed to bogie structure 24, passes upwardly through suitable bearings and the lowermost portion of bridge rear-end structure 13 and is affixed centrally at its upper end to a horizontally-disposed double-acting hydraulic cylinder 58. That cylinder is provided with the usual piston 59 and a piston rod which extends as end 60 from one side of piston 59 and as end 61 from the other side. Affixed to bridge structure 12 is an upright member 62 having a horizontal hole 63 aligned with piston rod 60 when mechanism 23 is in its locked position to be described, and also with the longitudinal center line of bridge 12. Upper pivot shaft 21 journaled in bearing 25 affixed to plate 33 is fitted at its lower end with an arm 64 extending at right angle thereto and aligned with the longitudinal center line of bridge 12 when mechanism 23 is in its locked position. Depending from the outer end of arm 64 is a vertical member 65 provided with a horizontal hole 66 aligned with piston rod 61 when shaft 21 is connected to shaft 22 as will be described. Holes 63 and 66 are dimensioned to receive the ends of piston rods 60 and 61. Members 62 and 65 are spaced from shafts 21 and 22 so that when the end of piston rod 60 is inserted in hole 63, end 61 of piston rod will clear element 65, and vice-versa. Cylinder 58 is provided with hose connections 68 and 69 at each end to a source of hydraulic fluid under pressure.

Bogie 14 is locked to bridge 12 by causing piston rod 60 to move outwardly so that its end enters hole 63 of element 62. Cylinder 58 and element 62 are aligned so that this will happen only when bogie 14 is aligned with bridge 12. That movement of piston 60 causes piston rod 61 to withdraw into cylinder 58 so that the outer end of piston rod 61 does not project beyond the end of cylinder 58. Arm 64 can then swing freely through considerably more than 180°. Shaft 22 is thus disconnected from shaft 21 and the means for rotating bogie 14 previously described. In this position of mechanism 23 my carrier is steered only by tractor 10, just as in any other tractor-trailer rig.

When it is desired to have bogie 14 steer in correspondence with tractor 10, piston rod 61 is caused to move outwardly so that it enters hole 66 of element 65. This can only be done when bogie 14 is aligned with bridge 12. That movement of piston rod 61 at the same time withdraws piston rod 60 from hole 63 in member 62, so disconnecting shaft 22 from bridge 12.

Cylinder 58 is operated only when its piston rod is aligned with the center line of bridge 12. If it were operated in any other position bogie 14 could rotate freely without any control. To prevent such operation an interlock is provided which is also shown in FIGS. 5, 6 and 7. One end of cylinder 58 is connected to a source of hydraulic fluid by hose 68. The other end is connected to one end of hose 69, the other end of which is connected to port 70 in ring 71. Ring 71 surrounds shaft 21 and is sealed thereto but does not rotate with it. Shaft 21 is provided on its diameter with a transverse hole 72 extending from port 70 to opposite port 74 of ring 71 when mechanism 23 is in its locked position. In that position that diameter is aligned with the center line of bridge 12. Hose 75 connects port 74 with the source of hydraulic fluid. Shaft 21 and ring 71 act as a rotary valve, and thus cylinder 58 can be opened only when its release of arm 64 coincides with its lock-in with element 62.

When tractor 10 is steered out of alignment with bridge 12 tractor and bridge rotate with respect to each other about vertical pivot 44. That rotation causes plate 43 carrying pivots 45 and 46 to rotate with respect to bridge 12, either to the right or to the left. FIG. 4 illustrates the position of the elements of bogie linkage 40 when tractor 10 is turned 90° to the right with respect to trailer bridge 12. The elements of tractor linkage 39 assume corresponding positions. As plate 43 rotates pin 46 moves arcuate link 52 in the direction of rotation of plate 43. Pin 54 at the outer end of link 52 moves connecting-link 42 forwardly but parallel to the center line of bridge 12 causing link 50a of bogie linkage 40 to pivot in the same direction as link 50, around its pivot 48a. On the other side of plate 43, pin 45 moves arcuate link 51 in the direction of rotation of plate 43 and pivot 53 carried by link 51 pushes connecting-link 41 with it, causing link 49a of bogie linkage 40 to pivot around its pivot 47a in the same direction as plate 43. Connecting-links 41 and 42 are therefore caused to move longitudinally but in opposite directions. As link 50a pivots, it pushes link 52a, and the other end of that link, being pivoted on pivot shaft 46a carried by plate 43a, causes that plate to rotate in the same direction as plate 43. Likewise, as link 49a is pushed by connecting-link 41 its rotation about is pivot 47a pulls link 51a with it which, in turn, pulls plate 43a causing it to rotate, and thus shaft 21 turns bogie 14 in the same direction and through the same angle as tractor 10.

It will be evident from FIG. 1 and FIG. 4 that 90° rotation of plate 43a, and therefore of bogie 14, is accompanied by rotation of pivot pins 53a and 54a through considerably smaller angles. It is thus possible for bogie 14 to be rotated 180° by my mechanism without the linkage going through any dead-center position, as would be the case with a simple link and crank. A single triple linkage as above described has been used heretofore to steer an articulated vehicle comprising a single-axle tractor and a trailer by turning it about its pivot, a pair of hydraulic cylinders replacing connecting-links 41 and 42 of my apparatus.

A slightly different arrangement of the mechanical means previously described for rotating bogie 14 with respect to bridge 12 and controlling that rotation to correspond with the rotation of tractor 10 is shown schematically in FIGS. 8 and 9. FIG. 8 shows the apparatus in plan as it appears when bogie 14 and tractor 10 are aligned with bridge 12 and FIG. 9 shows the apparatus with tractor 10 and bogie 14 turned 90° to the left from bridge 12.

Again the apparatus includes a triple linkage 77 at the tractor end of bridge 12 and a triple linkage 78 at the bogie end but the two linkages are reversed with respect to each other, each facing away from bridge 12. Pivot point 79 of linkage 77 is positioned directly above the vertical pivot of inverted fifth wheel 16, as is the case with linkage 39 previously described. Pivot points 83 and 84 correspond to stub shafts 45 and 46 previously described and together with pivot point 79 are mounted on a forwardly extending horizontal member 81 corresponding to plate 43. Pivot points 95 and 96 correspond to pivot shafts 47 and 48 and are mounted rearwardly of pivot point 79 on plate 32 which is affixed to bridge 12. Links 87 and 88 correspond to links 51 and 52 links 99 and 100 correspond to links 49 and 50.

Bogie linkage 78 except for its reversal corresponds to bogie linkage 40 previously described. Pivot point 80 is the upper end of pivot shaft 21. Pivot points 85 and 86 correspond to stub shafts 45a, and 46a, but are positioned rearwardly of pivot pin 80 and all three pivot points are carried by rearwardly extending horizontal member 82 affixed to shaft 21, similar to plate 43a. Pivot points 97 and 98 correspond to pivot shafts 47a and 48a but are positioned forwardly of pivot pin 80 and are mounted on plate 33. Links 89 and 90 correspond to links 51a and 52a and links 101 and 102 correspond to links 49a and 50a.

Bridge 12 is provided with toggle arms 109 and 110, spaced from each other and pivoted about their center points 103 and 104 respectively on the longitudinal central line of the bridge. The spacing between pivot point 103, which is nearer forward linkage 77, and pivot point 79 is the same as the spacing between pivot point 104 and pivot point 80. The length of toggle arm 109 as well as toggle arm 110 is equal to the spacing between pivot points 91 and 92 when linkages 77 and 78 are in their traveling position as shown in FIG. 8. Pivot point 92 is connected to pivot point 106 at the end of toggle arm 109 on the same side of the bridge center line by connecting-link 112 and pivot point 94 of linkage 78 is connected to pivot point 108 at the like end of toggle arm 110 by connecting-link 114. Connecting-links 112 and 114 are of equal length. Pivot point 91 is connected to pivot point 107 at the other end of toggle arm 110 by connecting-link 111 and pivot point 93 is connected to pivot point 105 at the other end of toggle arm 109 by connecting-link 113. Connecting-links 111 and 113 are offset vertically with respect to each other.

When tractor 10 is turned 90° to the left of bridge 12, the apparatus of FIG. 8 assumes the position shown in FIG. 9. As linkages 77 and 78 are reversed, member 82 must turn to the right when member 81 turns to the left. This reversal of direction is accomplished by toggle arms 109 and 110. As member 81 turns to the left, pivot point 92 is moved rearwardly, causing connecting-link 112 to move in the same direction. That movement causes toggle arm 109 to rotate counterclockwise about its pivot 103 and to pull connecting-link 113 forward. Likewise, when pivot point 91 is moved forwardly it causes connecting-link 111 to move in this direction and that connecting-link cuases toggle arm 110 also to rotate counterclockwise about its pivot 104. That rotation moves connecting-link 114 rearwardly. Connecting-links 113 and 114 thus combine to push pivot point 94 of bogie linkage 78 rearwardly and pull pivot point 93 forwardly, causing member 82 and shaft 21 to rotate counterclockwise. Bogie 14 is thus turned in the same direction and at the same angle as tractor 10. The mechanism of FIGS. 8 and 9 above described is advantageous for a vehicle with a long bridge because its connecting links are shorter and are supported by the toggle arms. The latter may be mounted on a common pivot.

When my vehicle is traveling along a roadway bogie pivot, shaft 22 is locked to bridge 12 is alignment therewith by my locking mechanism 23. Upper pivot shaft 21 is free, so that rotation of plate 43a corresponding to the steering of tractor 10 is not transmitted to bogie 14. Normally engine 15 is not started up. When it is desired to steer my vehicle into a pair of spaced apart aisles diverging from the roadway, lock 23 is released, upper pivot shaft 21 is engaged, and engine 15 is started up. Steering of tractor 10 then causes bogie 14 to rotate correspondingly so that the rear wheels of tractor 10 and bogie wheels follow parallel paths from the roadway into their respective aisles, the bogie moving under its own power. The skidding of the bogie wheels will be no greater then those of the rear wheels of the tractor under optimum conditions. These are, for a three-axle tractor, that the spacing of the rear tractor axles equal the spacing of the bogie axles and the vertical pivot point of each be centrally located with respect to the axles. For a two-axle tractor the optimum conditions require the tractor pivot point to be forward of the rear axle the same distance as the bogie pivot point is from either bogie axle. Reasonable departures from optimum conditions, however, may be tolerated.

Although I have described mechanical means for rotating my bogie in correspondence with the steering of my tractor I do not limit myself to those means. Other mechanical means may be used or hydraulic or electric means known to the art may be substituted therefore. Likewise, engine 15 of my bogie need not be an independent power source but may be a known electric or hydraulic motor driven from the tractor. The locking means for the bogie pivot shaft need not be a double-acting hydrualic cylinder carried by that pivot shaft as has been described but may comprise interconnected separate locking means for locking the bogie pivot shaft to the bogie triple linkage and separate locking means for locking the bogie pivot shaft to the bridge.

In the foregoing specification I have described presently preferred embodiments of my invention; however, it will be understood that my invention can be otherwise embodied within the scope of the following claims.

I claim:

1. A rubber-tired vehicle for plant roadway and off-highway carriage of heavy elongated loads comprising a tractor unit, an independently driven trailing end double axle bogie unit, an inverted generally U-shaped elongated load-carrying bridge supported at its front and rear ends by the tractor unit and bogie unit respectively so as to permit rotation of each unit with respect to the bridge about a vertical pivot carried by that unit, means attached to the bridge for carrying loads slung below it, means for rotating the bogie around its pivot, through an angle up to 90° each way from the long axis of the bridge, and control means for controlling those rotating means while the vehicle is in motion responsive to the steering of the tractor about its pivot so as to rotate the bogie in the same direction as the tractor and to the same extent.

2. Apparatus of claim 1 in which the vertical pivot of the bogie is centrally located between the bogie axles.

3. Apparatus of claim 1 in which the tractor unit has two rear axles and its vertical pivot is centrally located between the tractor rear axles.

4. Apparatus of claim 1 in which the tractor unit has two rear axles spaced apart the same distance as that between the bogie axles.

5. Apparatus of claim 1 including means for disengaging the control means.

6. Apparatus of claim 5 in which the vertical pivot of the bogie comprises a vertical pivot shaft extending into the bridge and the control means comprise a vertical control shaft journalled in the bridge above the bogie pivot shaft and aligned therewith an in which the means for disengaging the control means comprise means for releasably connecting the two pivot shafts at their adjoining ends.

7. Apparatus of claim 6 in which the means for releasably connecting the two pivot shafts comprise a transverse rod mounted on the upper end other bogie pivot shaft for movement along the axis of the rod, a horizontal arm attached to the lower end of the control shaft having a depending lug on its outer end with a horizontal hole therein adapted to receive an end of the rod, and means for moving the rod into and out of the hole.

8. Apparatus of claim 7 in which the means for moving the rod comprise a hydraulic cylinder.

9. Apparatus of claim 7 including an upstanding lug attached to the bridge with a horizontal hole therein adapted to receive an end of the rod, the lugs and the arm being positioned so that when the holes in the lugs are aligned with the rod, the bogie is aligned with the bridge, and means for moving the rod, the lugs being spaced from each other when aligned with the rod a distance less than the length of the rod so that the rod clears only one lug at a time.

10. Apparatus of claim 9 including means for preventing movement of the rod except when it is aligned with the holes in both lugs.

11. Apparatus of claim 9 in which the means for moving the rod comprise a double-acting hydraulic cylinder.

12. Apparatus of claim 11 including a hose connected to one end of the hydraulic cylinder and adapted to supply hydraulic fluid thereto, a valve in the hose, and means for opening and closing the valve driven by one of the pivot shafts, the open position of the valve being adjusted to coincide with alignment of the rod with the hole in the upstanding lug.

13. Apparatus of claim 12 in which the valve is a rotary valve and the rotary member comprises the pivot shaft driving it.

14. Apparatus of claim 1 in which the means for rotating the bogie around its pivot and the control means for controlling those rotating means in correspondence with the rotation of the tractor around its pivot comprise a triple linkage connecting the bogie with the bridge, an identical triple linkage connecting the tractor with the bridge, and a connecting-link connecting a pivot of the bogie linkage with the corresponding pivot of the tractor linkage, each linkage comprising a first link affixed at its inner end to the bogie or tractor, so as to rotate about the vertical pivot thereof, a second link pivotally attached at one end to the other end of the first link, and a third link pivotally attached at its outer end to the other end of the second link, and at its inner end to a pivot on the bridge spaced transversely and longitudinally from the vertical pivot of the bridge or tractor, the links being proportioned and positioned so that movement of the first link through 90° from the center line of bridge is accompanied by movement of the pivot between the second and third links of less than 90°, the connecting-link connecting that pivot of the bogie linkage with that pivot of the tractor linkage.

15. Apparatus of claim 14 in which the triple linkage connecting the bogie with the bridge is reversed with respect to the triple linkage connecting the tractor with the bridge and the connecting-link connecting that pivot of the bogie linkage with the corresponding pivot of the tractor linkage comprises a first connecting-link portion pivotally connected at one end to the bogie linkage pivot, a second connecting-link portion pivotally connected at one end to the corresponding tractor linkage pivot, and a toggle arm pivotally connecting the other ends of those connecting-link portions, the toggle arm being pivoted at its center on the longitudinal center line of the bridge.

* * * * *